US006562541B2

(12) United States Patent
Vanbesien et al.

(10) Patent No.: US 6,562,541 B2
(45) Date of Patent: May 13, 2003

(54) TONER PROCESSES

(75) Inventors: Daryl Vanbesien, Woodbridge (CA); Raj D. Patel, Oakville (CA); Michael A. Hopper, Toronto (CA); Stephan V. Drappel, Toronto (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/960,425

(22) Filed: Sep. 24, 2001

(65) Prior Publication Data

US 2003/0059704 A1 Mar. 27, 2003

(51) Int. Cl.[7] ........................... C08J 3/215; G03G 9/08

(52) U.S. Cl. .................................. 430/137.14; 523/335

(58) Field of Search ...................... 430/137.14; 523/335

(56) References Cited

U.S. PATENT DOCUMENTS

| | | | | |
|---|---|---|---|---|
| 3,674,736 A | | 7/1972 | Lerman et al. | 260/41 R |
| 4,137,188 A | | 1/1979 | Uetake et al. | 252/62.1 P |
| 4,558,108 A | | 12/1985 | Alexandru et al. | 526/340 |
| 4,797,339 A | | 1/1989 | Maruyama et al. | 430/109 |
| 4,983,488 A | | 1/1991 | Tan et al. | 430/137 |
| 4,996,127 A | | 2/1991 | Hasegawa et al. | 430/109 |
| 5,066,560 A | | 11/1991 | Tan et al. | 430/137 |
| 5,278,020 A | | 1/1994 | Grushkin et al. | 430/137 |
| 5,290,654 A | | 3/1994 | Sacripante et al. | 430/137 |
| 5,308,734 A | | 5/1994 | Sacripante et al. | 430/137 |
| 5,344,738 A | | 9/1994 | Kmiecik-Lawrynowicz et al. | 430/137 |
| 5,346,797 A | | 9/1994 | Kmiecik-Lawrynowicz et al. | 430/137 |
| 5,348,832 A | | 9/1994 | Sacripante et al. | 430/109 |
| 5,364,729 A | | 11/1994 | Kmiecik-Lawrynowicz et al. | 430/137 |
| 5,366,841 A | | 11/1994 | Patel et al. | 430/137 |
| 5,370,963 A | | 12/1994 | Patel et al. | 430/137 |
| 5,403,693 A | | 4/1995 | Patel et al. | 430/137 |
| 5,405,728 A | | 4/1995 | Hopper et al. | 430/137 |
| 5,418,108 A | | 5/1995 | Kmiecik-Lawrynowicz et al. | 430/137 |
| 5,496,676 A | | 3/1996 | Croucher et al. | 430/137 |
| 5,501,935 A | | 3/1996 | Patel et al. | 430/137 |
| 5,527,658 A | | 6/1996 | Hopper et al. | 430/137 |
| 5,585,215 A | | 12/1996 | Ong et al. | 430/107 |
| 5,650,255 A | | 7/1997 | Ng et al. | 430/137 |
| 5,650,256 A | | 7/1997 | Veregin et al. | 430/137 |
| 5,688,626 A | | 11/1997 | Patel et al. | 430/137 |
| 5,723,253 A | | 3/1998 | Higashino et al. | 430/166 |
| 5,744,520 A | | 4/1998 | Kmiecik-Lawrynowicz et al. | 523/334 |
| 5,747,215 A | | 5/1998 | Ong et al. | 430/137 |
| 5,763,133 A | | 6/1998 | Ong et al. | 430/137 |
| 5,766,818 A | | 6/1998 | Smith et al. | 430/137 |
| 5,804,349 A | | 9/1998 | Ong et al. | 430/110 |
| 5,827,633 A | | 10/1998 | Ong et al. | 430/137 |
| 5,840,462 A | | 11/1998 | Foucher et al. | 430/137 |
| 5,853,944 A | | 12/1998 | Foucher et al. | 430/137 |
| 5,863,698 A | | 1/1999 | Patel et al. | 430/137 |
| 5,869,215 A | | 2/1999 | Ong et al. | 430/137 |
| 5,902,710 A | | 5/1999 | Ong et al. | 430/110 |
| 5,910,387 A | | 6/1999 | Mychajlowskij et al. | 430/110 |
| 5,916,725 A | | 6/1999 | Patel et al. | 430/137 |
| 5,919,595 A | | 7/1999 | Mychajlowskij et al. | 430/137 |
| 5,925,488 A | | 7/1999 | Patel et al. | 430/137 |
| 5,965,316 A | * | 10/1999 | Kmiecik-Lawrynowicz et al. | 430/137.14 |
| 5,977,210 A | | 11/1999 | Patel et al. | 523/161 |
| 5,994,020 A | | 11/1999 | Patel et al. | 430/137 |
| 6,132,924 A | | 10/2000 | Patel et al. | 430/137 |
| 6,268,102 B1 | | 7/2001 | Hopper et al. | 430/137.14 |

OTHER PUBLICATIONS

Copending Application Ser. No. 08/922,437, filed Sep. 2, 1997, on "Metal–Accelerated Toner Processes", and published in Japan as Publication No. 11153883 on Jun. 8, 1999.

* cited by examiner

*Primary Examiner*—Christopher Rodee
(74) *Attorney, Agent, or Firm*—E. O. Palazzo

(57) ABSTRACT

A process for the preparation of toner by, for example, mixing a latex with a colorant mixture comprised of colorant, an ionic surfactant, and a polytetrafluoroethylene; adding a coagulant; heating the resulting mixture below about the glass transition temperature (Tg) of the latex resin; adding a stabilizer; heating above about the Tg of the latex resin; and isolating the toner.

3 Claims, No Drawings

TONER PROCESSES

PENDING APPLICATIONS AND PATENTS

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

In U.S. Pat. No. 6,268,102, the disclosure of which is totally incorporated herein by reference, there is illustrated a process for the preparation of toner comprising mixing a colorant, a latex, and two coagulants, followed by aggregation and coalescence, and wherein one of the coagulants is a polyaluminum sulfosilicate.

In now abandoned application U.S. Ser. No. 08/922,437, filed Sep. 2, 1997, on "Metal-Accelerated Toner Processes", the disclosure of which is totally incorporated herein by reference, is illustrated, for example, a process for the preparation of toner comprising (i) aggregating with a metal complex, or metal ion a colorant dispersion with a latex emulsion and optional additives to form aggregates;

(ii) coalescing or fusing the aggregates; and optionally (iii) isolating, washing, and drying the toner.

Illustrated in U.S. Pat. No. 5,994,020, the disclosure of which is totally incorporated herein by reference, are toner preparation processes, and more specifically, a process for the preparation of toner comprising:

(i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles; and a process for the preparation of toner comprising blending a latex emulsion containing resin, colorant, and a polymeric additive; adding an acid to achieve a pH of about 2 to about 4 for the resulting mixture; heating at a temperature about equal to, or about below the glass transition temperature (Tg) of the latex resin; optionally adding an ionic surfactant stabilizer; heating at a temperature about equal to, or about above about the Tg of the latex resin; and optionally cooling, isolating, washing, and drying the toner.

Illustrated in U.S. Pat. No. 5,688,626, the disclosure of which is totally incorporated herein by reference, are toner processes, and more specifically, a process for the preparation of toner in which the ionic surfactant selected for the preparation of the latex particles is an anionic surfactant and wherein the pigment dispersion selected contains a nonionic surfactant and optionally an anionic surfactant to which a cationic surfactant solution is added to form aggregates of a toner size followed by the addition of an anionic surfactant to stabilize the aggregates, followed by heating the resulting mixture during the coalescence step to a temperature above the resin Tg, to provide toner composite.

Illustrated in U.S. Pat. No. 6,132,924, the disclosure of which is totally incorporated herein by reference, are toner processes, and more specifically, a process for the preparation of toner wherein a dual coagulant or flocculating mixture such as a metal halide and a cationic surfactant solution is added to form toner aggregates, followed by adjusting the pH of the resulting mixture with a base to a pH value in the range of about 6.5 by heating the mixture to a temperature above the resin Tg, and by reducing the pH of the mixture to allow the coalescence/fusion of the aggregates.

The appropriate components and processes of the above recited copending applications and patents, inclusive of, for example, the resins, colorants, coagulants, and surfactants, may be selected for the processes of the present invention in embodiments thereof.

BACKGROUND OF THE INVENTION

The present invention is directed to a toner process, and more specifically, to chemical toner processes which involve the aggregation and fusion of latex, colorant like pigment or dye, and additive particles into toner particles. More specifically, in embodiments the present invention relates to toner processes wherein there is selected a fluoropolymer wherein the fluoropolymer (PTFE) is comprised, for example, of submicron anionic colloidal stabilized particles which when incorporated in the host resin of, for example, styrene butylacrylate beta carboxyl ethyl acrylate result in reducing the gloss levels of the image developed and provide an improvement in the hot offset temperature, thereby increasing the fusing latitude, wherein the fusing latitude is the temperature difference of the cold offset and the hot offset temperature where the greater the difference the larger the fusing latitude. The fusing latitude is also dependent on the type of fuser and the subsystems employed.

The incorporation of the colloidal, for example about 40 to about 125, about 75 to about 100, and more specifically, about 80 nanometers in diameter, fluoropolymer allows for a reduction of the gloss of the image developed to a matte finish wherein, for example, generally the greater the amount of incorporation of the fluoropolymer the greater the reduction in gloss of the image developed and the higher the hot offset temperature.

The toners generated with the processes of the present invention can be selected for copy and printing processes, including color processes and for imaging processes, especially xerographic processes, which usually desire a toner transfer efficiency of about 90 percent, such as those with a compact machine design without a cleaner or those that are designed to provide high quality colored images with excellent image resolution, acceptable signal-to-noise ratio, and image uniformity. Also, the toners obtained with the processes illustrated herein can be selected for digital imaging systems and processes.

PRIOR ART

In xerographic systems, especially color systems, small sized toners of, for example, from about 2 to about 8 microns can be important to the achievement of high image quality for process color applications. It is also important to have a low image pile height to eliminate, or minimize image feel and avoid paper curling after fusing. Paper curling can be particularly pronounced in xerographic color processes primarily because of the presence of relatively high toner coverage as a result of the application of three to four color toners. During fusing, moisture escapes from the paper due to high fusing temperatures of from about 120° C. to about 200° C. In the situation wherein only one layer of toner is selected, such as in one-color black or highlight color xerographic applications, the amount of moisture driven off during fusing can be reabsorbed by the paper and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, it may be useful to select certain toner particle sizes, such as from about 2 to about 10 microns, with a high colorant, especially pigment loading, such as from about 4 to about 15 percent by weight of toner, so that the mass of toner necessary for attaining the required optical density and color gamut can be significantly reduced to eliminate or minimize paper curl. Lower toner mass also ensures the achievement of image uniformity. However, higher pigment loadings often adversely affect the charging behavior of toners. For example, the charge levels may be too low for proper toner development or the charge distributions may be too wide and toners of wrong charge polarity may be present. Furthermore, higher pigment loadings may also result in the sensitivity of charging behavior to charges in environmental conditions such as temperature and humidity. Toners prepared in accordance with the processes of the present invention minimize, or avoid these disadvantages.

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. This process results, it is believed, in the formation of particles with a wide particle size distribution. Similarly, the aforementioned disadvantages, for example poor particle size distributions, are obtained hence classification is required resulting in low toner yields, are illustrated in other prior art, such as U.S. Pat. No. 4,797,339, wherein there is disclosed a process for the preparation of toners by resin emulsion polymerization, wherein similar to the '127 patent certain polar resins are selected; and U.S. Pat. No. 4,558,108, wherein there is disclosed a process for the preparation of a copolymer of styrene and butadiene by specific suspension polymerization. Other prior art includes U.S. Pat. Nos. 3,674,736;4,137,188 and 5,066,560.

Emulsion/aggregation/coalescence processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488 and 5,977,210. The appropriate components and processes of the above Xerox Corporation patents can be selected for the processes of the present invention in embodiments thereof.

With respect to the prior art, only a small part thereof has been selected and this part may or may not be fully representative of the prior art teachings or disclosures.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant dispersions, thus enabling the achievement of excellent color print quality and providing similar charging behavior despite differential colorant chemistry, and wherein the selection of the colloidal fluoropolymer particles in the host rest functions as a filler where the gloss is reduced due to differential melt temperatures of the host resin and the filler, which resin, for example, possesses a melt temperature in the range of about 130° C. to about 170° C. for styrene butylacrylate resin while the fluoropolymer filler melt temperature is in the range of about 160° C. to about 250° C. resulting in an increase in hot offset temperature and the capability to obtain spherical toners in short time periods, for example about 5 hours.

Another feature of the present invention resides in a process of preparing toners which when used in development enables images with a matte finish, that is for example, with gloss values (GGUs) of about 10 to about 25, and for example, a hot offset in excess of about 220° C. and an increase in the fusing latitude Wherein the fusing latitude is the difference in temperature between the cold offset temperature of the image developed and the hot offset of the developed image.

Additionally, another feature of the present invention resides in a process capable of delivering differing toner morphology particles, such as spherically shaped toner particles, and wherein the image gloss and matte obtained with such toners can be controlled with the amount of the colloidal fluoropolymer selected and wherein the gloss is about 10 to about 25 gardiner gloss units of the developed images.

Moreover, in another feature of the present invention there is provided emulsion, aggregation, coalescence processes wherein the toner obtained has incorporated during the process, colloidal polytetrafluoroethylene (PTFE) polymer particles and which particles function primarily to control gloss, and more specifically, to decrease gloss and increase the toner hot offset temperature thereby expanding the fusing latitude of the toners obtained.

Aspects of the present invention relate to a process for the preparation of toner comprising mixing a latex with a colorant mixture comprised of colorant, an ionic surfactant, and a polytetrafluoroethylene; adding a coagulant; heating the resulting mixture below about the glass transition temperature (Tg) of the latex resin; adding a stabilizer; heating above about the Tg of the latex resin; and optionally isolating the toner; a process wherein the latex is a latex emulsion comprised of resin, water, and an ionic surfactant, and wherein the colorant mixture is a dispersion containing a colorant, water, and an ionic surfactant; a process wherein the polytetrafluoroethylene is a copolymer of a size diameter of from about 30 to about 160 nanometers; a process wherein the polytetrafluoroethylene is of a size diameter of from about 50 to about 120 nanometers; a process wherein there is selected for the ionic surfactant a nonionic surfactant; a process wherein the polytetrafluoroethylene is a colloidal dispersion of polytetrafluoroethylene resin particles dispersed in an ionic surfactant or a nonionic surfactant; a process wherein the polytetrafluoroethylene is generated from the reaction of tetrafluoroethylene, hexafluoropropylene and vinylidene fluoride; a process wherein the polytetrafluoroethylene is generated from the reaction of tetrafluoroethylene, hexafluoropropylene and vinylidene fluoride in an amount of from about 30 to about 70 weight percent of tetrafluoroethylene, about 10 to about 30 weight percent of hexafluoropropylene, and about 10 to about 50 weight percent of vinylidene fluoride, and wherein the total of the three components is about 100 percent; a process wherein the polytetrafluoroethylene is generated from the reaction of tetrafluoroethylene, hexafluoropropylene and vinylidene fluoride in an amount of from about 40 to about 60 weight percent of tetrafluoroethylene, about 15 to about 25 weight percent of hexafluoropropylene, and about 20 to about 40 weight percent of vinylidene fluoride, and wherein the total of the three components is about 100 percent; a process wherein the polytetrafluoroethylene is selected in an amount of from about 0.05 to about 30 percent by weight of the toner components; a process wherein the polytetrafluoroethylene is selected in an amount of from about 1 to about 20 percent by weight of the toner components; a process wherein the polytetrafluoroethylene is selected in an amount of from about 3 to about 10 percent by weight of the toner components; a process wherein each of the surfactants is selected in an amount of from about 1 to about 10 weight percent based on the toner components amounts; a process wherein there is added to the mixture a second latex, and which latex is comprised of submicron resin particles suspended in an aqueous phase containing an ionic surfactant, and wherein the second latex is optionally selected in an amount of about 10 to about 40 percent by weight of the initial latex; a process wherein the temperature about below the latex resin Tg is from about 40° C. to about 60° C., thereby resulting in toner aggregates, and the temperature above about the latex resin Tg is from about 75° C. to about 97° C.; a process wherein the temperature at which the aggregation is accomplished controls the size of the aggregates, and wherein the toner isolated is from about 2 to about 15 microns in volume average diameter; a process wherein the colorant is a pigment; a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene) poly (propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly (styrene-butyl acrylate-acrylononitrile-acrylic acid); a process wherein the colorant is carbon black, cyan, yellow, magenta, or mixtures thereof, and the toner isolated is from about 2 to about 25 microns in volume average diameter, and the particle size distribution thereof is optionally from about 1.15 to about 1.30, and wherein there is added to the surface of the formed toner metal salts, metal salts of fatty acids, silicas, metal oxides, or mixtures thereof, each in an amount of from about 0.1 to about 10 weight percent of the obtained toner; a process wherein the coagulant is a polyaluminum chloride, a polyaluminum sulfo silicate, a metal halide, a metal sulfate, a cationic surfactant, or mixtures thereof; a process wherein the metal is selected from the group consisting of calcium, magnesium, aluminum, zinc, and barium; a process wherein the stabilizer is a base; a process wherein the base is selected from the group consisting of sodium hydroxide, potassium hydroxide, and ammonium hydroxide; a process wherein the stabilizer is a surfactant; a process wherein the surfactant is an anionic surfactant or a nonionic surfactant; a process wherein the colorant is a colorant dispersion comprised of (i) a colorant, water, an ionic surfactant, a nonionic surfactant or mixtures of an ionic surfactant, and a nonionic surfactant; the latex is a latex emulsion; and wherein the (ii) colorant dispersion is blended with the latex emulsion comprised of resin, a nonionic surfactant, a polytetrafluoroethylene, and an ionic surfactant, and optionally adding a wax dispersion comprised of submicron particles in the diameter size range of about 0.1 to about 0.4 micron dispersed in an ionic surfactant of the same charge polarity as that of the ionic surfactant in the colorant dispersion or latex emulsion;

(iii) adding to the resulting blend containing the latex and colorant the coagulant to thereby initiate aggregation of the resin latex and colorant particles;

(iv) heating the resulting mixture below about, or about equal to the glass transition temperature (Tg) of the latex resin to form toner sized aggregates;

(v) optionally adding a second latex comprised of resin particles suspended in an aqueous phase to the formed toner aggregates; and adding to the formed toner aggregates (v) the stabilizer;

(vi) heating the resulting aggregate suspension above about the Tg of the latex resin; and isolating; a process wherein there is added to the mixture a wax dispersion comprised of submicron particles in the size diameter range of about 0.1 to about 0.5 micron dispersed in an anionic surfactant of the same charge polarity as that of the ionic surfactant in the latex emulsion; a process comprising mixing a latex with a colorant mixture comprised of colorant, an ionic surfactant or a surfactant, and a polytetrafluoroethylene; adding a coagulant; heating the resulting mixture below about the glass transition temperature (Tg) of the latex resin; and heating above about the Tg of the latex resin; a process wherein the surfactant is an ionic surfactant, and wherein there results a toner; a process wherein the surfactant is a nonionic surfactant, and wherein there results a toner; a process for the preparation of toner comprising (i) providing or generating a latex emulsion of resin, water, and an ionic surfactant, and providing or generating a colorant dispersion containing a colorant, water, an ionic surfactant, or a nonionic surfactant;

(ii) providing or generating a wax dispersion containing submicron polyethylene or polypropylene particles, an anionic surfactant similarly charged to that of the latex surfactant emulsion;

(iii) blending the latex emulsion with the wax dispersion (ii) and with the colorant dispersion;

(iv) adding to the resulting blend containing the latex and colorant a polytetrafluoroethylene colloidal dispersion, a suitable coagulant, or optionally a dual coagulant;

(v) heating the resulting mixture below about the glass transition temperature (Tg) of the latex resin;

(vi) optionally adding a second latex comprised of resin particles suspended in an aqueous phase;

(vii) followed by increasing the pH of mixture (vi) which has an initial pH value in the range of about 2 to about 3 to a pH value of about 6.5 to about 8 with a base;

(viii) heating (vii) above about the Tg of the latex resin;

(ix) followed by a reduction in pH of the above mixture (vii) from a pH value which is in the range of about 6.5 to about 8 to about 3.5 to about 4.5 with an acid, wherein the reduction in pH is accomplished, for example, in a time period of about 0.5 to about 2 hours;

(x) retaining the mixture (vi) at a temperature of from about 70° C. to about 95° C. for about 3 to about 10 hours;

(xi) washing the resulting toner slurry; and (xii) isolating the toner; a process wherein the coagulant is a polyaluminum chloride, polyaluminum sulfosilicate, aluminum sulfate, magnesium sulfate, zinc sulfate, or other suitable coagulants; a process wherein two coagulants when selected comprise the aforementioned coagulants and a second coagulant of cationic surfactant of, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, the halide salts of quaterized polyoxyethylalkylamines, dodecylbenzyl triethyl ammonium chloride, and which coagulant component is selected in an amount of, for example, from about 0.01 to about 10 percent by weight of toner; a process wherein there is added during or subsequent to (vii) a second latex, and which latex is comprised of submicron, below about 1 micron in diameter, resin particles suspended in an aqueous phase containing an ionic surfactant, and wherein the second latex is selected in an amount of about 10 to about 40 percent by weight of the initial latex; a process wherein the second latex (vi) is added and enables formation of a shell or coating on the resulting toner aggregates of (v), and wherein the thickness of the formed shell is from about 0.1 to about 1 micron; a process wherein the added latex contains the same resin as the initial latex of (i), or wherein the added latex contains a dissimilar resin than that of the initial latex resin (i); a process wherein (v) is accomplished by heating at a temperature below the glass transition temperature of the resin or polymer contained in the latex (i) and (viii) is accomplished by heating at a temperature of above the glass transition temperature of the polymer contained in the latex (i) to enable fusion or coalescence of colorant and latex resin (i); a process wherein the temperature (v) is from about 40° C. to about 60° C., and the pH (vii) is from about 6.5 to about 8, and the temperature (viii) is from about 75° C. to about 97° C.; a process wherein the pH (ix) is decreased to a pH range of from about 3 to about 4.5 with an acid; a process wherein subsequent to (v) toner aggregates are formed, and wherein the temperature at which the aggregation is accomplished controls the size of the aggregates, and wherein the toner isolated is from about 2 to about 15 microns in volume average diameter, and wherein the heating (viii) is accomplished; a process for preparing toner particles comprising (i) providing or generating a latex emulsion of resin, water, and an anionic surfactant;

(ii) providing or generating a colorant dispersion containing a colorant, water, a nonionic surfactant, or optionally an ionic surfactant similarly charged to that of the emulsion latex;

(iii) mixing the latex emulsion with the colorant dispersion of (ii);

(iv) adding to the resulting blend containing the latex and colorant a polytetrafluoroethylene colloidal dispersion, and a suitable cationic surfactant;

(v) heating the resulting mixture below about the glass transition temperature (Tg) of the latex resin;

(vi) adding a second latex comprised of resin particles suspended in an aqueous phase to the mixture of (v);

(vii) followed by the addition of an ionic or nonionic surfactant aqueous solution to stabilize the toner size aggregates of (vi);

(viii) heating (vii) above about the Tg of the latex resin;

(ix) retaining the mixture (vi) at a temperature of from about 70° C. to about 95° C. for 3 to 10 hours;

(x) optionally washing the resulting toner slurry; and (xi) isolating the toner; a process wherein the latex emulsion comprises submicron resin particles in the size range of about 100 to about 500 nanometers and preferably in the size range of about 150 to about 400 nanometers in water and an ionic surfactant and preferably an anionic surfactant; the colorant dispersion comprises submicron pigment particle in the size range of about 50 to about 250 nanometers and preferably in the range of about 80 to about 200 nanometers in size and the polytetrafluoroethylene colloidal dispersion is in the size range of about 40 to about 150 nanometers, and more specifically, in the range of about 75 to about 125 nanometers and suspended in water and a nonionic or optionally an ionic surfactant; a toner process wherein the cationic surfactant comprises, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and which coagulant surfactant component is selected in an amount of, for example, from about 0.01 to about 10 percent by weight of toner; a process wherein there is added during or subsequent to (v) a second latex, and which latex is comprised of submicron resin particles suspended in an aqueous phase containing an ionic surfactant, and wherein the second latex is optionally selected in an amount of about 15 to about 35 percent by weight of the initial latex; a process wherein the second latex (vi) is added and enables formation of a coating on the resulting toner aggregates of (v), and wherein the thickness of the formed coating is from about 0.1 to about 1 micron; a process wherein the temperature (v) is from about 50° C. to about 60° C., and the temperature (viii) is from about 80° C. to about 95° C.; a process wherein the latex (i) contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a process wherein the colorant is carbon black, cyan, yellow, magenta, or mixtures thereof, and the toner isolated is from about 1 to about 25 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner; a process for the preparation of toner comprising mixing a colorant dispersion containing a pigment, coagulant, wax particles and PTFE with a latex, followed by aggregation and coalescence; a process wherein the colorant is a colorant dispersion comprised of a colorant, water, coagulant, PTFE, an ionic surfactant, a nonionic surfactant or mixtures of an ionic surfactant and a nonionic surfactant; the latex is a latex emulsion; and wherein the colorant dispersion is blended with the latex emulsion comprised of resin, a nonionic surfactant, and an ionic surfactant, and thereafter adding a wax dispersion comprised of submicron particles in the size range of about 0.1 to about 0.4 micron dispersed in an ionic surfactant of the same charge polarity of that of the ionic surfactant in the colorant dispersion or latex emulsion to which a coagulant or a plurality of coagulants is added to initiate flocculation of latex, colorant and additives;

heating the resulting mixture below about, or about equal to the glass transition temperature (Tg) of the latex resin to form toner sized aggregates; heating the resulting aggregate suspension above about, or about equal to the Tg of the latex resin;

retaining the resulting mixture above at a temperature in the range of from about 70° C. to about 95° C. to enable the fusion or coalescence of the toner aggregates;

washing the resulting toner slurry; and isolating the toner wherein the toner particle size is about 2 to about 20 microns; and a process wherein there is added to the colorant dispersion a wax dispersion comprised of submicron particles in the size diameter range of about 0.1 to about 0.5 micron dispersed in an anionic surfactant of the same charge polarity of that of the ionic surfactant in the latex emulsion.

Example of polytetrafluroethylenes (PTFE) include, for example, colloidal polytetrafluoroethylene copolymer, such as copolymers of tetrafluoroethylene, hexafluoropropylene, and vinylidene fluoride with a tunable or preselected polytetrafluoroethylene melting point, and which melting point can be varied depending on, for example, the ratio of tetrafluoroethylene, hexafluoropropylene, vinylidene fluoride, and wherein colloidal refers, for example, to particles with a size diameter of from about 70 to about 90 nanometers, and more specifically, about 80 nanometers and which polytetrafluoroethylenes are available from 3M. Monomers selected to prepare the polytetrafluoroethylene possess ratios of, for example, about 30 to about 70 weight percent tetrafluoroethylene, about 10 to about 30 weight percent hexafluoropropylene, and about 10 to about 50 weight percent vinylidene fluoride, totaling about 100 percent to provide a polytetrafluoroethylene with melting points of from about 160° C. to about 250° C., however, other copolymers of tetrafluoroethylene and perfluorovinylether, and alternating copolymers of tetrafluoroethylene and ethylene can provide melting points in excess of about 250° C. such as from about 260° C. to about 275° C.

As examples of coagulants selected in various suitable and effective amounts there are mentioned cationic surfactants, polyaluminum chlorides, polyaluminum sulfo silicates (PASS), aluminum sulfate, zinc sulfate, magnesium sulfate, aluminum chloride, zinc chloride, magnesium chloride and the like with the amount being about 0.05 to about 10 percent, or about 0.10 to about 0.5 percent by weight of toner wherein the toner comprises resin, colorant, PTFE, and wax in the ratio of 76:5:10:9.

Illustrative examples of resin, polymer or polymers selected for the process of the present invention and present in the latex (i) or added latex include known polymers, such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly (butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner compositions in various suitable amounts, such as from about 75 weight percent to about 98, or from about 80 to about 95 weight percent of the toner or of the solids, and the latex size suitable for the processes of the present invention can be, for example, from about 0.05 micron to about 0.5 micron in volume average diameter as measured by the Brookhaven nanosize particle analyzer. Other sizes and effective amounts of latex polymer may be selected in embodiments. The total of all toner components, such as resin, PTFE, and colorant, is about 100 percent, or about 100 parts.

The polymer selected for the process of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes. Also, the reactant initiators, chain transfer agents, and the like as disclosed in U.S. Ser. No. 08/922,437, the disclosure of which is totally incorporated herein by reference, can be selected for the processes of the present invention in embodiments thereof.

Examples of waxes include those as illustrated herein, such as those of the aforementioned copending applications, polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550™, a low weight average molecular weight polypropylene available from Sanyo Kasei K.K., and similar materials. The commercially available polyethylenes selected possess, it is believed, a molecular weight $M_w$ of from about 1,000 to about 1,500, while the commercially available polypropylenes utilized for the toner compositions of the present invention are believed to have a molecular weight of from about 4,000 to about 5,000. Examples of functionalized waxes include, such as amines, amides, for example AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and SC Johnson wax.

Various known colorants, such as pigments, selected for the processes of the present invention and present in the toner in an effective amount of, for example, from about 1 to about 25 percent by weight of toner, and more specifically, in an amount of from about 3 to about 10 percent by weight, that can be selected include, for example, carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB560™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Yellow 180 and Permanent Yellow FGL. Colored magnetites, such as mixtures of MAPICO BLACK™, and cyan components may also be selected as pigments for the processes of the present invention, wherein the pigment amount is, for example, about 3 to 15 weight percent of the toner. Dye examples include known suitable dyes, reference the Color Index, and a number of U.S. patents, inclusive of food dyes, and the like.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent, and more specifically, from about 0.2 to about 5 percent (weight percent). Examples of organic soluble initiators include Vazo peroxides, such as VAZO 64™, 2-methyl 2-2'-azobis propanenitrile, VAZO 88™, 2-2'-azobis isobutyramide dehydrate in a suitable amount, such as in the range of from about 0.1 to about 8 percent.

Examples of chain transfer agents include dodecanethiol, octanethiol, carbon tetrabromide and the like in various suitable amounts, such as in the range amount of from about 0.1 to about 10 percent, and more specifically, in the range of from about 0.2 to about 5 percent by weight of monomer.

Surfactants for the preparation of latexes and colorant dispersions can be ionic or nonionic surfactants in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUA™ available from Alkaril Chemical Company, SANIZOL™ (benzalkonium chloride), available from Kao Chemicals, and the like, selected in effective amounts of, for example, from about 0.01 percent to about 10 percent by weight. The molar ratio of the cationic surfactant used for flocculation to the anionic surfactant used in the latex preparation is, for example, in the range of from about 0.5 to about 4.

Examples of nonionic surfactants selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The toner may also include known charge additives in effective suitable amounts of, for example, from 0.1 to 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, other known charge additives, and the like.

Surface additives that can be added to the toner compositions after washing or drying include, for example, metal salts, metal salts of fatty acids, colloidal silicas, coated silicas, metal oxides, strontium titanates, mixtures thereof, and the like, which additives are each usually present in an amount of from about 0.1 to about 2 weight percent, reference for example U.S. Pat. Nos. 3,590,000; 3,720,617; 3,655,374 and 3,983,045, the disclosures of which are totally incorporated herein by reference. Additive examples include zinc stearate and AEROSIL R972® available from Degussa. The silicas of U.S. Pat. No. 6,190,815 and U.S. Pat. No. 6,004,714, the disclosures of which are totally incorporated herein by reference, can also each be selected in amounts, for example, of from about 0.1 to about 2 percent, which additives can be added during the aggregation or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. The carrier particles can also be comprised of a core with a polymer coating thereover, such as polymethylmethacrylate (PMMA) having dispersed therein a conductive component like conductive carbon black. Carrier coatings include silicone resins, fluoropolymers, mixtures of resins not in close proximity in the triboelectric series, thermosetting resins, and other known components.

Imaging methods are also envisioned with the toners of the present invention, reference for example a number of the patents mentioned herein, and U.S. Pat. Nos. 4,265,990; 4,858,884; 4,584,253 and 4,563,408, the disclosures of which are totally incorporated herein by reference.

The following Examples are presented.

EXAMPLES

Latex Preparation—Semicontinuous Method (E/A 12–45)

A latex emulsion comprised of polymer particles generated from the emulsion polymerization of styrene, butyl acrylate and beta carboxyl ethyl acrylate (βCEA) was prepared as follows. A surfactant solution of 1.59 kilograms of DOWFAX 2A1™ (anionic emulsifier) and 430 kilograms of deionized water was prepared by mixing for 10 minutes in a stainless steel holding tank. The holding tank was then purged with nitrogen for 5 minutes before transferring the mixture resulting into a reactor. The reactor was then continuously purged with nitrogen while being stirred at 100 RPM. The reactor was then heated up to 80° C. Separately, 6.8 kilograms of ammonium persulfate initiator were dissolved in 33.55 kilograms of deionized water and added.

Separately, a monomer emulsion was prepared in the following manner. 366 Kilograms of styrene, 86 kilograms of butyl acrylate, 14 kilograms of β-CEA, 6 kilograms of 1-dodecanethiol, 3 kilograms of dodecanediol diacrylate (ADOD), 8.05 kilograms of DOWFAX™ (anionic surfactant), and 216 kilograms of deionized water were mixed to form an emulsion. Five percent of the above emulsion was then slowly fed into the reactor containing the above aqueous surfactant phase at 80° C. to form "seeds" while being purged with nitrogen. The initiator solution was then slowly charged into the reactor and after 10 minutes the remainder of the emulsion was continuously fed into the reactor using metering pumps.

Once all the monomer emulsion was charged into the main reactor, the temperature was held at 800° C. for an additional 2 hours to complete the reaction. Full cooling was then accomplished and the reactor temperature was reduced to 35° C. The product was collected in a holding tank. After drying the latex, the resin molecular properties were $M_w$=33,500, $M_n$=11,800, and the onset Tg was 51° C. The latex was comprised of 40 percent of resin, 58.5 percent of water and 1.5 percent of anionic surfactant.

TONER PREPARATION EXAMPLES

Example I

Preparation of a 5 Percent PTFE Cyan Toner

277 Grams of the above prepared latex emulsion and 53 grams of an aqueous anionic wax dispersion of P 725, available from Petrolite Corporation, a polypropylene wax having a solids content of 31 percent, 45 grams of an aqueous anionic blue (PB 15.3) pigment.dispersion having a solids content of 23 percent, and 22 grams of an 80 nanometer colloidal PTFE dispersion (THV 350C) having a solids content of 47 percent were simultaneously added to 630 milliliters of water while being blended at a speed of 5,000 rpm with a polytron. To this mixture were added 30 grams of an aqueous coagulant solution of 3 grams of polyaluminum chloride (PAC) solution dissolved in 27 grams of 0.02 M nitric acid solution, while being blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates of a size of 4.5 microns and a GSD of 1.27. 136 Grams of the above prepared latex was then introduced into the reactor while stirring. After an additional 30 minutes, the particle size measured was 5.6 microns with a GSD of 1.22. The pH of the resulting mixture was then adjusted from 2 to 7.8 with an aqueous base solution of 4 percent sodium hydroxide and allowed to stir for an additional 15 minutes. Subsequently, the resulting mixture was heated to 95° C. and retained there for a period of 1 hour. The particle size measured was 6.2 microns with a GSD of 1.22. The pH was then reduced to 4 using a 2.5 percent nitric acid solution. The resultant mixture was then allowed to coalesce for an additional 5 hours, resulting in a total coalescence time of 6 hours at a temperature of 95° C. The morphology of the particles was spherical. The particle size measured was 6 microns (volume average diameter throughout) with a GSD of 1.22. The reactor was then cooled down to room temperature, about 25° C., and the particles were washed 5 times, where the first wash was conducted at pH of 11, followed by two washes with deionized water, followed by one wash at a pH of 4, and the last wash being conducted with deionized water. The resulting toner after drying was comprised of 5 percent of pigment (PB 15.3), 8 percent of P 725 wax, 5 percent of PTFE and 82 percent of polymer resin.

Example II

Preparation of a 10 Percent PTFE Cyan Toner

253 Grams of the above prepared latex emulsion and 53 grams of P 725 wax dispersion having a solids content of 31 percent, 45 grams of a blue pigment (9910-1) dispersion having a solids content of 23 percent, and 44 grams of 80 nanometer colloidal PTFE solution (THV 350C) having a solids content of 47 percent were simultaneously added to 630 milliliters of water with high shear stirring by means of a polytron. To this mixture were added 30 grams of an aqueous coagulant solution of 3 grams of polyaluminum chloride (PAC) solution dissolved in 27 grams of 0.02 M nitric acid solution, while being blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates of a size of 4.4 microns and a GSD of 1.22. 136 Grams of the above prepared latex were then introduced into the reactor while stirring. After an additional 30 minutes, the particle size measured was 5.5 microns with a GSD of 1.22. The pH of the resulting mixture was then adjusted from 2 to 7.8 with aqueous base solution of 4 percent sodium hydroxide and allowed to stir for an additional 15 minutes. Subsequently, the resulting mixture was heated to 95° C. and retained there for a period of 1 hour. The particle size measured was 5.7 microns with a GSD of 1.22. The pH was then reduced to 3.8 using a 2.5 percent-nitric acid solution. The resultant mixture was then allowed to coalesce for an additional 5 hours resulting in a total coalescence time of 6 hours at a temperature of 95° C. The morphology of the particles was spherical. The particle size measured was 5.6 microns with a GSD of 1.23. The reactor was then cooled down to room temperature and the particles were washed 5 times, where the first wash was conducted at a pH of 11, followed by 2 washes with deionized water, one wash carried out at a pH of 4, and a last wash with deionized water. The resulting toner after drying was comprised of 5 percent of pigment (PB 15.3), 8 percent of P 725 wax, 10 percent of PTFE and 77 percent of the above polymer resin.

Example III

Preparation of a 10 Percent PTFE Magenta Toner

235 Grams of the above prepared latex emulsion and 52 grams of P 725 wax dispersion having a solids content of 31 percent, 62 grams of a Red 122 dispersion having a solids content of 15.3 percent, 14 grams of a Red 185 dispersion having a solids content of 16.9 percent, and 42 grams of 80 nanometer colloidal PTFE solution (THV 350C) having a solids content of 47 percent were simultaneously added to 630 milliliters of water with high shear stirring by means of a polytron. To this mixture were added 30 grams of an aqueous coagulant solution of 3 grams of polyaluminum chloride (PAC) solution dissolved in 27 grams of 0.02 M nitric acid solution, while being blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates size of 4.4 microns and a GSD of 1.22. 136 Grams of the above prepared latex were then introduced into the reactor while stirring. After an additional 30 minutes, the particle size measured was 5.5 microns with a GSD of 1.21. The pH of the resulting mixture was then adjusted from 2 to 7.8 with an aqueous base solution of 4 percent sodium hydroxide and allowed to stir for an additional 15 minutes. Subsequently, the resulting mixture was heated to 95° C. and retained there for a period of 1 hour. The particle size measured was 5.6 microns with a GSD of 1.21. The pH was then reduced to 3.8 using a 2.5 percent nitric acid solution. The resultant mixture was then allowed to coalesce for an additional 5 hours resulting in a total coalescence time of 6 hours at a temperature of 95° C. The morphology of the particles was spherical. The particle size measured was 5.6 microns with a GSD of 1.21. The reactor was then cooled down to room temperature and the particles were washed 5 times, where the first wash was conducted at pH of 11, followed by 2 washes with deionized water, one wash being accomplished at a pH of 4, and a last wash with deionized water. The resulting toner after drying was comprised of 6 percent pigment (80 percent of Red 122, 20 percent of Red 185), 8 percent P 725 of wax, 10 percent of PTFE and 76 percent of the above polymer resin.

Example IV

Preparation of a 10 Percent PTFE Black Toner

235 Grams of the above prepared latex emulsion and 52 grams of P 725 wax dispersion having a solids content of 31 percent, 76 grams of a REGAL 330® black dispersion having a solids content of 18.1 percent, and 42 grams of 80 nanometer colloidal PTFE solution (THV 350C) having a solids content of 47 percent were simultaneously added to 630 milliliters of water with high shear stirring by means of a polytron. To this mixture were added 30 grams of an aqueous coagulant solution of 3 grams of polyaluminum chloride (PAC) solution dissolved in 27 grams of 0.02 M nitric acid solution, while being blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates size of 4.4-microns and a GSD of 1.22. 136 Grams of the above prepared latex was then introduced into the reactor while stirring. After an additional 30 minutes, the particle size measured was 5.5 microns with a GSD of 1.20. The pH of the resulting mixture was then adjusted from 2 to 7.8 with aqueous base solution of 4 percent sodium hydroxide and allowed to stir for an additional 15 minutes. Subsequently, the resulting mixture was heated to 95° C. and retained there for a period of 1 hour. The particle size measured was 5.5 microns with a GSD of 1.20. The pH was then reduced to 3.8 using a 2.5 percent nitric-acid solution. The resultant mixture was then allowed to coalesce for an additional 5 hours resulting in a total coalescence time of 6 hours at a temperature of 95° C. The morphology of the particles was spherical. The particle size measured was 5.5 microns with a GSD of 1.20. The reactor was then cooled down to room temperature and the particles were washed 5 times, where the first wash was conducted at pH of 11, followed by 2 washes with deionized water, one wash accomplished at a pH of 4, and the last wash with deionized water. The resulting toner after drying was comprised of 7 percent of pigment (REGAL 330® black), 8 percent of P 725 wax, 10 percent of PTFE and 75 percent of the above polymer resin.

Example V

Preparation of a 10 Percent PTFE Cyan Toner Using Sani-PAC as the Aggregant 253 Grams of the above prepared latex emulsion and 52 grams of P 725 wax dispersion having a solids content of 31 percent, 48 grams of a blue pigment (PB 15.3) dispersion having a solids content of 23 percent, and 42 grams of 80 nanometer diameter colloidal PTFE solution (THV 350C) having a solids content of 47 percent were simultaneously added to 630 milliliters of water with high shear stirring by means of a polytron. To this mixture were added 1.5 grams of polyaluminum chloride solution (10 percent solids) placed in 13.5 grams of 0.02 M $HNO_3$, and 1.5 grams of a cationic surfactant placed in 13.5 grams of distilled water, and blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates size of 4.4 microns and a GSD of 1.22. 136 Grams of the above prepared latex were then introduced into the reactor while stirring. After an additional 30 minutes, the particle size measured was 5.5 microns with a GSD of 1.22. The pH of the resulting mixture was then adjusted from 2 to 7.8 with aqueous base solution of 4 percent sodium hydroxide and allowed to stir for an additional 15 minutes. Subsequently, the resulting mixture was heated to 95° C. and retained there for a period of 1 hour. The particle size measured was about 5.7 microns with a GSD of 1.22. The pH was then reduced to 4.5 using a 2.5 percent nitric acid solution. The resultant mixture was then allowed to coalesce for an additional 4 hours, resulting in a total coalescence time of 5 hours at a temperature of 95° C. The morphology of the particles was spherical. The particle size measured was about 5.7 microns with a GSD of 1.23. The reactor was then cooled down to room temperature and the particles were washed 5 times, where the first wash was conducted at a pH of 11, followed by 2 washes with deionized water, one wash being accomplished at a pH of 4, and the last wash with deionized water. The resulting toner after drying was comprised of 5.5 percent of pigment (PB 15.3), 10 percent of PTFE and 84.5 percent of the above polymer resin.

Example VI

Preparation of a 10 Percent PTFE Cyan Toner Using Sanizol as the Aggregant

276 Grams of the above prepared latex emulsion, 48 grams of a blue pigment (PB 15.3) dispersion having a solids content of 23 percent, and 42 grams of 80 nanometer colloidal PTFE solution (THV 350C) having a solids content of 47 percent were simultaneously added to 630 milliliters of water with high shear stirring by means of a polytron. To this mixture were added 3 grams of a cationic surfactant placed in 30 grams of distilled water, and blended at a speed of 5,000 rpm for a period of 2 minutes. The resulting mixture was transferred to a 2 liter reaction vessel and stirred at 400 rpm. This solution was then heated to a temperature of 47° C. After 75 minutes at a temperature of 47° C., there resulted aggregates of a size of 4.4 microns and a GSD of 1.22. 136 Grams of the above prepared latex were then introduced into the reactor while.stirring. After an additional 30 minutes, the particle size measured was 5.5 microns with a GSD of 1.20. To this solution were added 46 grams of a NEOGEN R™ solution of 20 percent NEOGEN R™ and 80 percent deionized water. This was allowed to stir for an additional 15 minutes. Subsequently, the resulting mixture was heated to 95° C. and retained there to coalesce for a period of 4 hours resulting in a total coalescence time of 4 hours at a temperature of 95° C. The particle size measured was 5.5 microns with a GSD of 1.20. The morphology of the particles was spherical. The reactor was then cooled down to room temperature and the particles were washed 5 times with deionized water. The resulting toner after drying was comprised of 5.5 percent of pigment (PB 15.3), 10 percent of PTFE and 84.5 percent of the above polymer resin.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process for the preparation of toner comprising mixing a latex with a mixture comprised of colorant, an ionic surfactant, and a polytetrafluoroethylene; adding a coagulant; heating the mixture of latex, colorant, ionic surfactant, polytetrafluoroethylene, and coagulant below about the glass transition temperature (Tg) of the latex resin; adding a stabilizer; heating above about the Tg of the latex resin; and optionally isolating the toner, wherein said polytetrafluoroethylene is generated from the reaction of tetrafluoroethylene, hexafluoropropylene, and vinylidene fluoride.

2. A process for the preparation of toner comprising mixing a latex with a mixture comprised of colorant, an ionic surfactant, and a polytetrafluoroethylene; adding a coagulant; heating the mixture of latex, colorant, ionic surfactant, polytetrafluoroethylene, and coagulant below about the glass transition temperature (Tg) of the latex resin; adding a stabilizer; heating above about the Tg of the latex resin; and optionally isolating the toner, and wherein said polytetrafluoroethylene is generated from the reaction of tetrafluoroethylene, hexafluoropropylene, and vinylidene fluoride with an amount of from about 30 to about 70 weight percent of tetrafluoroethylene, about 10 to about 30 weight percent of hexafluoropropylene, and about 10 to about 50 weight percent of vinylidene fluoride; and wherein the total of the three components is about 100 percent.

3. A process for the preparation of toner comprising mixing a latex with a mixture comprised of colorant, an ionic surfactant, and a polytetrafluoroethylene; adding a coagulant; heating the mixture of latex, colorant, ionic surfactant, polytetrafluoroethylene, and coagulant below about the glass transition temperature (Tg) of the latex resin; adding a stabilizer; heating above about the Tg of the latex resin; and optionally isolating the toner, and wherein said polytetrafluoroethylene is generated from the reaction of tetrafluoroethylene, hexafluoropropylene, and vinylidene fluoride with an amount of from about 40 to about 60 weight percent of tetrafluoroethylene, about 15 to about 25 weight percent of hexafluoropropylene, and about 20 to about 40 weight percent of vinylidene fluoride; and wherein the total of the three components is about 100 percent.

* * * * *